July 7, 1959  A. J. PASQUA  2,893,376
BEVERAGE CUP
Filed Sept. 21, 1956
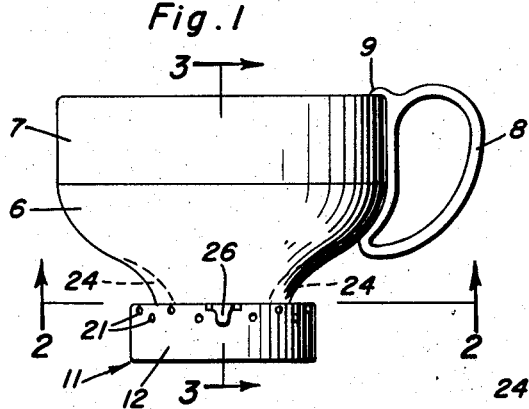
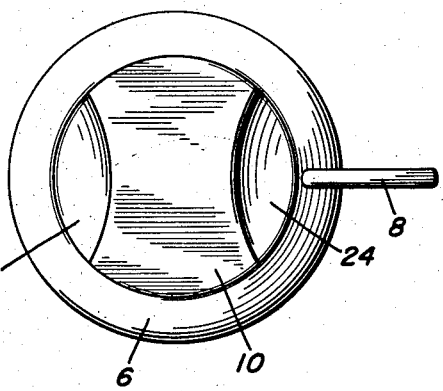
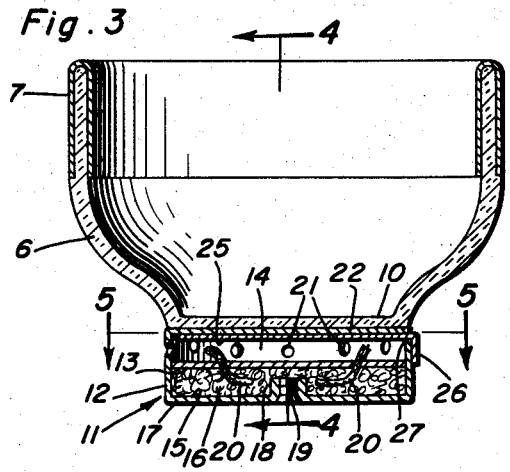
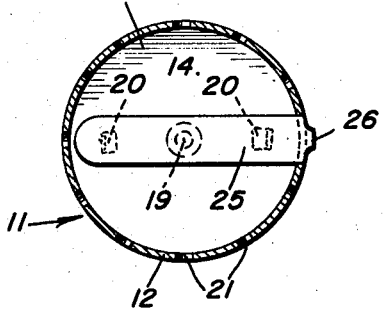
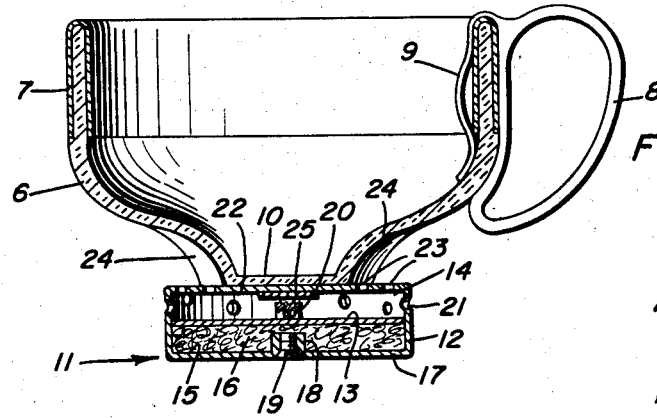
Angelo J. Pasqua
INVENTOR.

United States Patent Office 2,893,376
Patented July 7, 1959

2,893,376

BEVERAGE CUP

Angelo J. Pasqua, New York, N.Y.

Application September 21, 1956, Serial No. 611,117

1 Claim. (Cl. 126—261)

The present invention relates to new and useful improvements in drinking cups particularly for tea, instant coffee, etc., and has for its primary object to provide, in a manner as hereinafter set forth, a cup of this character comprising novel means for rapidly heating the beverage to the desired temperature.

Another very important object of the invention is to provide a self-contained beverage making cup of the aforementioned character comprising a liquid fuel burning heating unit which may be expeditiously cleaned of carbon deposits or soot when necessary.

Other objects of the invention are to provide a beverage cup of the character described which will be comparatively simple in construction, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of a beverage cup constructed in accordance with the present invention;

Figure 2 is a bottom plan view of the cup with the heating unit removed therefrom;

Figure 3 is a view in transverse section, taken substantially on the line 3—3 of Figure 1;

Figure 4 is a cross-sectional view, taken substantially on the line 4—4 of Figure 3; and Figure 5 is a view in horizontal section, taken substantially on the line 5—5 of Figure 3.

Referring now to the drawing in detail, it will be seen that the embodiment of the invention which has been illustrated comprises a cup 6 of suitable heat conducting material such, for instance, as an aluminum alloy. Of course, the cup 6 may also be of any suitable dimensions or capacity. The upper portion of the cup 6 is provided with a lip protecting brim 7 of a suitable material of low heat conductivity.

Removably mounted on the cup 6 is a handle 8, also of a material of low heat conductivity. Mounted on the handle 8 is a clip 9 which is engageable in the cup 6 for detachably securing said handle thereon.

Rigidly secured in any suitable manner beneath the bottom 10 of the cup 6 is a heater which is designated generally by reference character 11. The heater 11, which also functions as a base for the cup 6, comprises a short, cylindrical casing 12 of substantially the diameter of the bottom 10 of the cup 6, as shown to advantage in Figure 3 of the drawing.

A horizontal partition 13 divides the casing 12 into upper and lower compartments providing, respectively, combustion and fuel chambers 14 and 15. The chamber 15 is for the reception of a suitable liquid fuel and is substantially filled with cotton or other suitable absorbent material, as indicated at 16. The bottom 17 of the casing 12 is provided with a centrally located filling opening 18 for the fuel chamber 15, in which opening a closure plug 19 is threaded. The partition 13 is apertured to accommodate wicks 20 from the fuel chamber 15 to the combustion chamber 14.

The cylindrical wall of the combustion chamber 14 is provided with spaced air holes 21 to promote combustion. Openings 23 are also provided in the top 22 of the casing 12. The lower portion of the cup 6 is provided, on diametrically opposite sides with depressions or channels 24 which communicate with the openings 23.

Removably mounted in the upper portion of the combustion chamber 14, above the wicks 20 is a carbon or soot collecting strip or plate of suitable metal. The elongated plate or strip 25 terminates, at one end, in a depending operating handle or lip 26 which is engageable with the periphery of the casing 12 in the manner shown to advantage in Figure 3 of the drawing. A slot 27 in the upper portion of the casing 12 slidably accommodates the plate 25 and frictionally secures same in position.

It is thought that the use of the invention will be readily apparent from a consideration of the foregoing. Briefly, a suitable liquid fuel is placed in the chamber 15 to be absorbed by the material 16, after which the plug 19 is inserted. The wicks 20 are then ignited in any suitable manner, as by inserting a match through any of the openings in the combustion chamber 14. Heat from the unit 11 escapes from the casing 12 through the openings 21 and 23 and passes upwardly through the recesses or channels 24 around the cup 6 for heating the beverage in said cup in an obvious manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A beverage container comprising a cup of heat conducting material for the reception of a beverage, a heating unit mounted beneath the cup for heating the beverage therein and constituting a base therefor, said heating unit including a substantially cylindrical casing, a horizontal partition in said casing defining an upper combustion chamber and a lower fuel chamber, wicks extending through the partition from the fuel chamber into the combustion chamber, a removable carbon collecting plate slidably mounted in the casing above the wicks, the lower portion of the cup having channels therein extending to the bottom thereof, said casing having air passages therein communicating with the combustion chamber and with said channels.

References Cited in the file of this patent

UNITED STATES PATENTS

| | | |
|---|---|---|
| 397,150 | Sweet | Feb. 5, 1889 |
| 915,715 | Kolsky | Mar. 16, 1909 |
| 999,134 | Toan | July 25, 1911 |
| 1,058,601 | Knittel | Apr. 8, 1913 |
| 1,203,774 | Ogden | Nov. 7, 1916 |
| 1,412,704 | Osborne | Apr. 11, 1922 |
| 1,482,271 | Simms | Jan. 29, 1924 |
| 2,299,730 | Bornstein | Oct. 27, 1942 |
| 2,517,584 | Mapes | Aug. 8, 1950 |
| 2,541,034 | Chace | Feb. 13, 1951 |

FOREIGN PATENTS

| | | |
|---|---|---|
| 575,104 | France | July 24, 1924 |
| 676,483 | Great Britain | July 30, 1952 |
| 1,075,829 | France | Oct. 20, 1954 |